(12) United States Patent
Baasch

(10) Patent No.: US 9,638,081 B2
(45) Date of Patent: May 2, 2017

(54) GASEOUS FLUID METERING UNIT

(71) Applicant: International Engine Intellectual Property Company, LLC, Lisle, IL (US)

(72) Inventor: Oswald Baasch, Bowling Green, KY (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 27 days.

(21) Appl. No.: 14/786,616

(22) PCT Filed: Apr. 23, 2013

(86) PCT No.: PCT/US2013/037750
§ 371 (c)(1),
(2) Date: Oct. 23, 2015

(87) PCT Pub. No.: WO2014/175868
PCT Pub. Date: Oct. 30, 2014

(65) Prior Publication Data
US 2016/0084132 A1     Mar. 24, 2016

(51) Int. Cl.
| F16K 31/02 | (2006.01) |
| F01N 3/20  | (2006.01) |
| G05D 16/20 | (2006.01) |
| G05D 23/19 | (2006.01) |
| F16K 17/02 | (2006.01) |
| F16K 31/06 | (2006.01) |

(52) U.S. Cl.
CPC ............ *F01N 3/2066* (2013.01); *F16K 17/02* (2013.01); *F16K 31/02* (2013.01); *F16K 31/0644* (2013.01); *G05D 16/202* (2013.01); *G05D 16/2006* (2013.01); *G05D 23/19* (2013.01); *G05D 23/1927* (2013.01); *F01N 2610/02* (2013.01)

(58) Field of Classification Search
CPC .... F01N 3/2066; F16K 31/02; F16K 31/0644; G05D 16/202; G05D 16/2006; G05D 23/1927; G05D 23/19
USPC .............................................. 137/613, 487.5
See application file for complete search history.

(56) References Cited

U.S. PATENT DOCUMENTS

| 4,854,123 A | 8/1989 | Kobayashi |
| 5,021,227 A | 6/1991 | Kobayashi |
| 5,116,579 A | 5/1992 | Kobayashi |
| 5,369,956 A | 12/1994 | Daudel |
| 5,643,536 A | 7/1997 | Schmelz |
| 5,785,937 A | 7/1998 | Neufert |
| 5,809,975 A | 9/1998 | Tuckey |

(Continued)

*Primary Examiner* — Kevin Lee
(74) *Attorney, Agent, or Firm* — Jack D. Nimz; Jeffrey P. Calfa

(57) ABSTRACT

A fluid metering unit has a housing providing a flow path from an inlet port through a first solenoid valve and a second solenoid valve to an outlet port. An electric circuit board for operating the solenoid valves is contained within the housing. Also contained within the housing and connected to the electric circuit board are a temperature sensor and a pressure sensor for sensing temperature and pressure in the flow path. An electric-operated temperature control element in thermally conductive contact with the housing controls temperature along at least a portion of the flow path.

13 Claims, 3 Drawing Sheets

(56) References Cited

U.S. PATENT DOCUMENTS

| | | | |
|---|---|---|---|
| 5,943,858 A | 8/1999 | Hofmann | |
| 5,954,089 A * | 9/1999 | Seymour | F16K 31/0675 137/487.5 |
| 6,082,102 A | 7/2000 | Wissler | |
| 6,759,021 B1 | 7/2004 | Berthold | |
| 6,779,541 B2 * | 8/2004 | Inayama | G05D 16/2093 137/487.5 |
| 7,131,456 B2 * | 11/2006 | Kang | G05D 7/0647 137/487.5 |
| 7,273,595 B2 | 9/2007 | Spokoyny | |
| 7,373,775 B2 | 5/2008 | Breuer | |

* cited by examiner

GASEOUS FLUID METERING UNIT

TECHNICAL FIELD

This disclosure relates to a gaseous fluid metering unit for metering gaseous fluid flow from a source to a point of use.

BACKGROUND

Certain uses of certain gaseous fluids involve metering flow of a gaseous fluid so that a proper quantity of gaseous fluid is delivered to a point of use. An example of a gaseous fluid which may be metered is gaseous ammonia which is used in certain types of engine exhaust after-treatment systems. Proper metering provides proper chemical reactions to reduce certain emission products without significant ammonia slip.

SUMMARY

A fluid metering unit comprises a housing having an inlet port and an outlet port. The housing contains a first solenoid valve which has an inlet and an outlet at opposite ends of a central longitudinal axis and a second solenoid valve has an inlet and an outlet at opposite ends of a central longitudinal axis.

The housing provides a flow path from the inlet port to the inlet of the first solenoid valve, from the outlet of the first solenoid valve to the inlet of the second solenoid valve, and from the outlet of the second solenoid valve to the outlet port.

The housing also contains a first sensor having a central longitudinal axis at one end of which a sensing tip of the first sensor is exposed to the flow path at a location between the inlet port and the inlet of the first solenoid valve and a second sensor having a central longitudinal axis at one end of which a sensing tip of the second sensor is exposed to the flow path at a location between the outlet of the second solenoid valve and the outlet port.

The housing comprises multiple cavities having central longitudinal axes which are mutually parallel. Each of the first solenoid valve, the second solenoid valve, the first sensor, and the second sensor is disposed in a respective cavity coaxial with the central longitudinal axis of the respective cavity.

An electric-operated temperature control element is in thermally conductive contact with the housing for controlling temperature along at least a portion of the flow path.

The foregoing summary is accompanied by further detail of the disclosure presented in the Detailed Description below with reference to the following drawings which are part of the disclosure.

DETAILED DESCRIPTION

Figure 1:
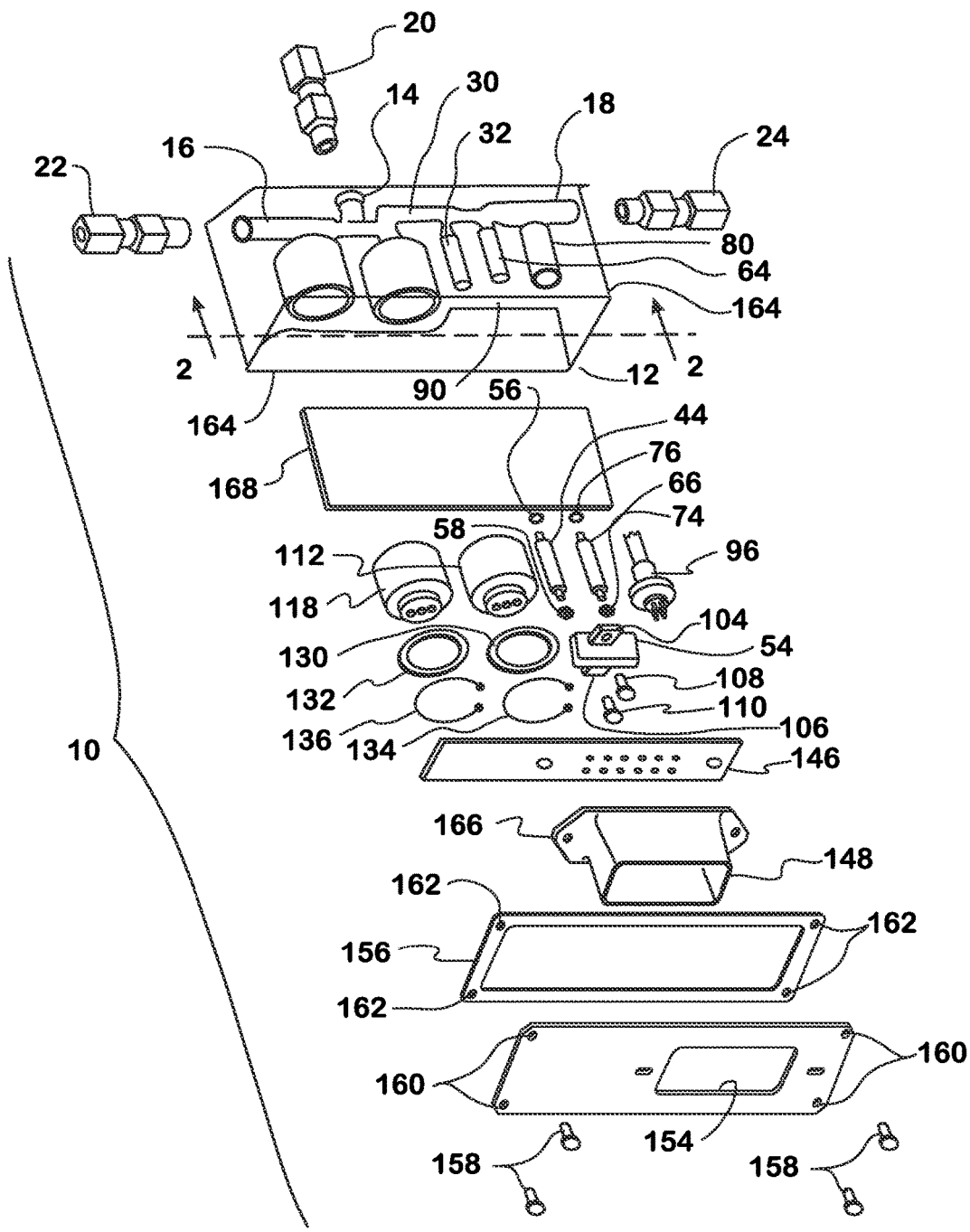
FIG. 1 is an exploded perspective view of a gaseous fluid metering unit.
Figure 2:
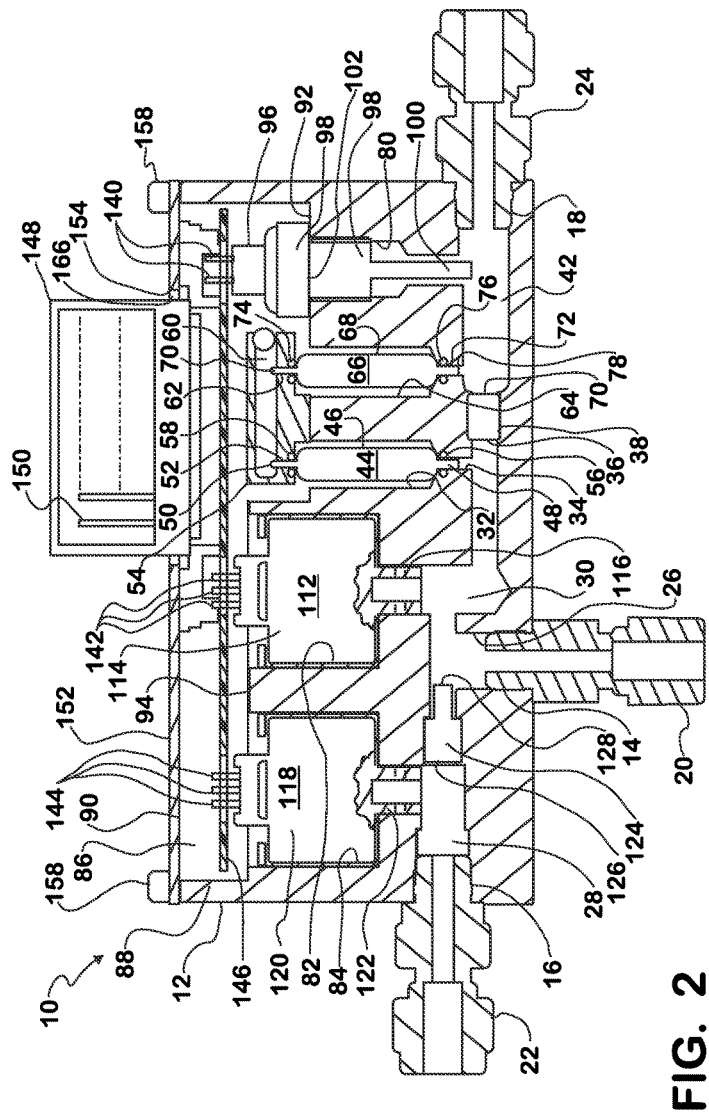
FIG. 2 is an enlarged cross section view through the assembled gaseous fluid metering unit of FIG. 1 in the direction of arrows 2-2 in FIG. 1.

FIGS. 1 and 2 show a gaseous fluid metering unit (GFMU) 10 comprising a housing 12 having a first inlet port 14, a second inlet port 16, and an outlet port 18. Housing 12 can be fabricated by machining a metal piece, such as a block of aluminum for example, to incorporate the ports and other features which will be described.

A respective metal fitting 20, 22, 24 is threaded into a respective one of the ports 14, 16, 18 to enable GFMU 10 to be connected into a gaseous fluid system (not shown) which delivers a gaseous fluid from a source to a point of use. Fitting 20 is a first inlet fitting and fitting 24 is an outlet fitting. They are disposed on respective longitudinal axes which are perpendicular to each other. Fitting 22 is a second inlet fitting which is disposed on a longitudinal axis parallel to the axis of fitting 24 and perpendicular to the axis of fitting 20.

A passage 26 from first inlet port 14 and a passage 28 from second inlet port 16 merge into a passage 30 which leads to a cylindrical first cavity 32 having a cylindrical neck 34 which is open to passage 30. Passage 30 also leads to a relief inlet 36 of a pressure relief valve 38 which has a relief outlet 40 open to a passage 42 which leads to outlet port 18. Relief inlet 36 opens relief outlet 40 when pressure at relief inlet 40 exceeds pressure at relief outlet 40 by a relief setting of pressure relief valve 38. Passage 42 and the portion of passage 30 coaxial with passage 42 are portions of a bore in housing 12.

A first solenoid valve 44 is disposed coaxially within first cavity 32. First solenoid valve 44 comprises a cylindrical body 46 having a cylindrical inlet neck 48 at one lengthwise end and a cylindrical outlet neck 50 at an opposite lengthwise end. Outlet neck 50 is fit to an entrance hole 52 in a manifold 54 which is in assembly with housing 12. An o-ring 56 circumferentially seals an outside diameter of inlet neck 48 to an inside diameter of neck 34, and an o-ring 58 circumferentially seals an outside diameter of outlet neck 50 to an inside diameter of entrance hole 52.

Manifold 54 further comprises a closed runner 60 having a length parallel with passage 42 and an exit hole 62. Entrance hole 52 and exit hole 62 are mutually parallel and each extends through a wall of manifold 54 from a respective location proximate a respective lengthwise end of runner 60.

Housing 12 comprises a cylindrical second cavity 64 alongside and lengthwise parallel with first cavity 32. A second solenoid valve 66 is disposed coaxially within second cavity 64 and comprises a cylindrical body 68 having a cylindrical inlet neck 70 at one lengthwise end and a cylindrical outlet neck 72 at an opposite lengthwise end. An o-ring 74 circumferentially seals an outside diameter of inlet neck 70 to an inside diameter of exit hole 62, and an o-ring 76 circumferentially seals an outside diameter of outlet neck 72 to an inside diameter of a cylindrical neck 78 of second cavity 64 which is open to passage 42.

Housing 12 comprises a cylindrical third cavity 80, a cylindrical fourth cavity 82, and a cylindrical fifth cavity 84 which are mutually lengthwise parallel. Cavity 80 is alongside and parallel with second cavity 64. Cavities 82, 84 are alongside each other and parallel with first cavity 32, with fourth cavity 82 being closer to first cavity 32.

Housing 12 comprises an open space 86 which is surrounded by a rectangular perimeter wall 88 which has a flat end surface 90. Open space 86 is also bounded by two floor surfaces 92, 94 at different elevations below end surface 90.

A temperature sensor 96 comprises a cylindrical body 98 which is partially received coaxially within third cavity 80 to expose a sensing tip end 100 to passage 42 at an intersection of third cavity 80 and passage 42. Body 98 comprises a shoulder 102 via which temperature sensor 96 is supported on a portion of floor surface 92 which surrounds third cavity 80.

Manifold 54 comprises ears 104, 106 (FIG. 1) containing holes through each of which a respective screw 108, 110 passes and is tightened in a respective threaded hole in housing 12 to fasten manifold 54 in place as a part of housing 12.

A first pressure sensor 112 comprises a cylindrical body 114 received coaxially within fourth cavity 82 to expose a sensing tip end 116 to passage 30. A second pressure sensor 118 comprises a cylindrical body 120 received coaxially within fifth cavity 84 to expose a sensing tip end 122 to passage 28. A check valve 124 is disposed in passage 26 downstream of sensing tip end 122 and upstream of passage 30. Check valve 124 has an inlet 126 toward second inlet port 16 and an outlet 128 toward passage 30. Check valve 124 is disposed in a portion of passage 28 leading to passage 30 and functions to allow flow from second inlet port 16 through passages 28 and 30 to the inlet of first solenoid valve 44 and to disallow backflow from passage 30 through passage 28 to second inlet port 16.

At an end of first pressure sensor 112 opposite sensing tip 116, an o-ring 130 (FIG. 1) circumferentially seals an outside diameter of body 114 to an inside diameter of fourth cavity 82, and at an end of second pressure sensor 118 opposite sensing tip 122, an o-ring 132 circumferentially seals an outside diameter of body 120 to an inside diameter of fifth cavity 84. A split-ring retainer 134 is fit in a circular groove in housing 12 surrounding fourth cavity 82 just below floor surface 94 to engage o-ring 130 and retain o-ring 130 and first pressure sensor 112 in place so that passage 30 is sealed from open space 86. A split-ring retainer 136 is fit in a circular groove in housing 12 surrounding fifth cavity 84 just below floor surface 94 to engage o-ring 132 and retain o-ring 132 and second pressure sensor 118 in place so that passage 28 is sealed from open space 86.

Temperature sensor 96 comprises electrical terminals, 140 generally, at a lengthwise end opposite sensing tip end 100. First pressure sensor 112 comprises electrical terminals, 142 generally, at a lengthwise end opposite sensing tip end 116. Second pressure sensor 118 comprises electrical terminals, 144 generally, at a lengthwise end opposite sensing tip end 122.

Terminals 140, 142, 144 connect to various circuit points of electric circuits on a generally rectangular electric circuit board 146 which is disposed within open space 86. An electric connector 148 is mounted on electric circuit board 146 to connect its electrical terminals, 150 generally, to various circuit points of electric circuits on electric circuit board 146.

A cover 152 is assembled to housing 12 to close open space 86. Cover 152 comprises a clearance hole 154 for electric connector 148 which allows a rectangular perimeter margin of cover 152 to sandwich a rectangular gasket 156 against end surface 90 when shanks of screws 158 are passed through clearance holes 160 at the four corners of cover 152 and clearance holes 162 at the four corners of gasket 156 and tightened in holes 164 in housing 12. Gasket 156 provides a seal to housing 12 and a gasket 166 on a flange which surrounds electric connector 148 seals the latter to cover 152.

An electric-operated temperature control element, or device, 168 is disposed in thermally conductive relationship against an interior surface of housing 12 for controlling temperature of housing 12. Element 168 may be an electric-operated heater, cooler, or device, such as a Peltier Effect device, which can operate either as a heat source or a heat sink to assure that a gaseous fluid being metered remains in gas phase. Element 168 has electric connection to a circuit on electric circuit board 146. Fabrication of housing 12 from aluminum provides good thermal conductivity for heat transfer from temperature control element 168 through housing 12 to the flow path including at least that portion of the flow path containing second solenoid valve 66.

Figure 3:
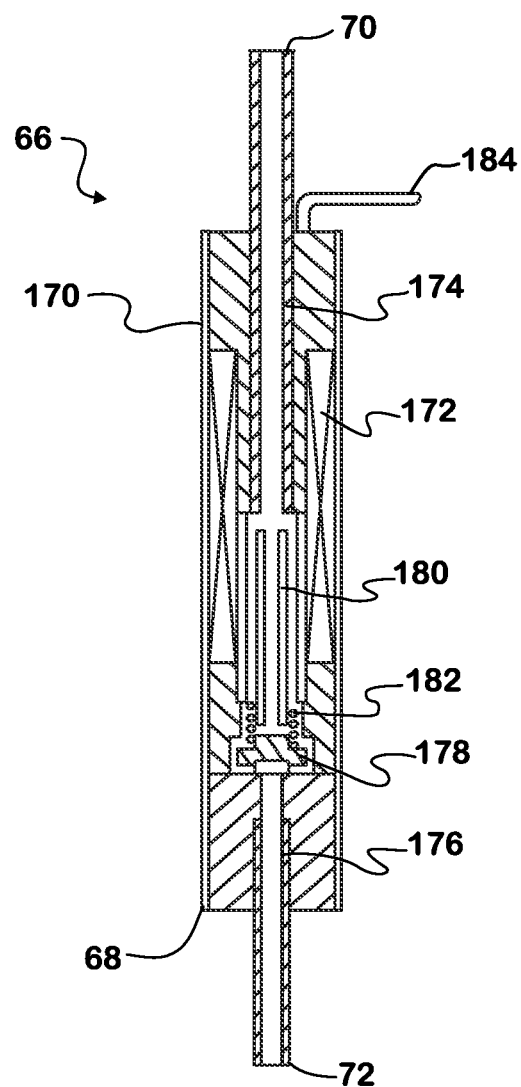
FIG. 3 is a longitudinal cross section view through a component of the gaseous fluid metering unit of FIG. 1 shown on a larger scale by itself.

FIG. 3 shows detail of second solenoid valve 66. An outer cylindrical shield 170 and several internal parts form body 68. A solenoid coil 172 is contained within body 68. Inlet neck 70 is an external portion of a tubular conduit 174 having an internal portion which fits within body 68, and outlet neck 72 is an external portion of a tubular conduit 176 having an internal portion which fits within body 68.

An armature 178 within body 68 controls flow which has entered the valve through conduit 174 to conduit 176. A tubular stator 180 is disposed within a flow path between conduit 174 and conduit 176. A spring 182 biases armature 178 to close conduit 174 to conduit 176.

Terminals, 184 generally, connect solenoid coil 172 to points on circuit board 146.

When solenoid coil 172 is energized, armature 178 is attracted to stator 180 and opens conduit 174 to conduit 176 to allow flow to pass through the valve by passing from conduit 174 through a passage 186 circumferentially surrounding stator 180 into a space 188 containing armature 178, and through a passage 190 and conduit 174.

When solenoid coil 172 ceases to be energized, spring 182 returns armature 178 to close passage 190 and stop flow through the valve.

First solenoid valve 44 has the same exterior dimensions as second solenoid valve 66 and is similar in internal construction to second solenoid valve 66, but the two solenoid valves are operated in different ways. Electric circuit board 146 comprises a circuit for operating first solenoid valve 44 by either opening or closing it to thereby either allow or disallow flow through a flow path from one of inlet ports 14, 16, through passage 30, through first solenoid valve 44, through runner 60, through second solenoid valve 66, and through passage 42 to outlet port 18. Electric circuit board 146 comprises a circuit for operating second solenoid valve 66 by a pulse width modulated voltage having an appropriate frequency when first solenoid valve 44 is being operated to open the flow path. The pulse width is varied in accordance with a control signal which sets a correspondingly metered quantity of fluid. First solenoid valve 44 can be considered a shut-off valve while second solenoid valve 66 can be considered a metering valve which is constructed to accurately meter flow of a gaseous fluid. The presence of temperature control element 168 assures that the gaseous fluid flow path through GFMU 10 is controlled to proper temperature for maintaining flow in gas phase through at least a portion of the flow path which includes second solenoid valve 66.

Because gas density is a function of pressure and temperature, temperature sensor 96 provides a signal for use in temperature compensating the pulse width voltage, and first pressure sensor 112 provides a signal for use in pressure compensating the pulse width voltage.

Control of metering may be performed either locally or remotely. Local control is performed by circuits on electric circuit board 146 which process local pressure and temperature signals to compensate a locally generated pulse width modulated voltage corresponding to a metering control signal delivered from a remote source via electric connector 148. Remote control is performed by remote circuits which process pressure and temperature signals received from GFMU 10 via electric connector 148 to compensate a remotely generated pulse width modulated voltage for second solenoid valve 66 which is delivered to GFMU 10 via electric connector 148.

GFMU 10 can be used to meter flow of gaseous ammonia to an exhaust after-treatment system of a motor vehicle which is propelled by an internal combustion engine. The presence of two inlet ports 14, 16 accommodates two on-board ammonia canisters (not shown) each connected to a respective inlet fitting 20, 22 so that one can continue to supply ammonia when ammonia in the other has been depleted. Ammonia metered by GFMU 10 is delivered to the after-treatment system through a conduit (not shown) connected to outlet fitting 24.

While the example of using GFMU 10 to meter ammonia gas is representative gaseous fluid metering, GFMU may be suitable for metering certain non-gaseous fluids.

What is claimed is:

1. A fluid metering unit comprising:
a housing comprising an inlet port and an outlet port;
a first solenoid valve having an inlet and an outlet at opposite ends of a central longitudinal axis;
a second solenoid valve having an inlet and an outlet at opposite ends of a central longitudinal axis;
a flow path within the housing from the inlet port to the inlet of the first solenoid valve, from the outlet of the first solenoid valve to the inlet of the second solenoid valve, and from the outlet of the second solenoid valve to the outlet port;
a first sensor having a central longitudinal axis at one end of which a sensing tip of the first sensor is exposed to the flow path at a location between the inlet port and the inlet of the first solenoid valve;
a second sensor having a central longitudinal axis at one end of which a sensing tip of the second sensor is exposed to the flow path at a location between the outlet of the second solenoid valve and the outlet port;
the housing comprising multiple cavities having central longitudinal axes which are mutually parallel;
the first solenoid valve, the second solenoid valve, the first sensor, and the second sensor each being disposed in a respective cavity coaxial with the central longitudinal axis of the respective cavity; and
an electric-operated temperature control element in thermally conductive contact with the housing for controlling temperature along at least a portion of the flow path.

2. The fluid metering unit as set forth in claim 1 in which the first sensor comprises a pressure sensor for sensing fluid pressure in the flow path, and the second sensor comprises a temperature sensor for sensing fluid temperature in the flow path.

3. The fluid metering unit as set forth in claim 2 in which the housing comprises a bore having a longitudinal axis which is perpendicular to the central longitudinal axis of the first solenoid valve and to the central longitudinal axis of the second solenoid valve and the bore forms a portion of the flow path to the inlet of the first solenoid valve and a portion of the flow path from the outlet of the second solenoid valve, and further comprising a pressure relief valve disposed within a portion of the bore between the inlet of the first solenoid valve and the outlet of the second solenoid valve, the pressure relief valve having a relief inlet open to the portion of the flow path to the inlet of the first solenoid valve and a relief outlet open to the portion of the flow path from the outlet of the second solenoid valve for opening the relief inlet to the relief outlet when pressure at the relief inlet exceeds pressure at the relief outlet by a relief setting of the pressure relief valve.

4. The fluid metering unit as set forth in claim 3 in which the housing contains a manifold having a runner forming the portion of the flow path from the outlet of the first solenoid valve to the inlet of second solenoid valve.

5. The fluid metering unit as set forth in claim 4 in which the runner has a length which is parallel with the longitudinal axis of the bore.

6. The fluid metering unit as set forth in claim 5 in which the first solenoid valve comprises a cylindrical body having an inlet neck at one of the opposite ends of its central longitudinal axis and an outlet neck at another of the opposite ends of its central longitudinal axis, and the second solenoid valve comprises a cylindrical body having an inlet neck at one of the opposite ends of its central longitudinal axis and an outlet neck at another of the opposite ends of its central longitudinal axis.

7. The fluid metering unit as set forth in claim 1 further comprising an inlet fitting fit to the inlet port and an outlet fitting fit to the outlet port, the inlet fitting and the outlet fitting being disposed on respective central longitudinal axes which are perpendicular to each other.

8. The fluid metering unit as set forth in claim 7 in which the housing further comprises a second inlet port and a bore from the second inlet port to the portion of the flow path to the inlet of the first solenoid valve, and further comprising a third sensor having a central longitudinal axis at one end of which a sensing tip of the third sensor is exposed to the bore, and a check valve closing a portion of the bore between the sensing tip of the third sensor and the portion of the flow path to the inlet of the first solenoid valve, the check valve allowing flow from the second inlet port to the portion of the flow path to the inlet of the first solenoid valve and disallowing backflow through the check valve to the second inlet port.

9. The fluid metering unit as set forth in claim 8 in which the first sensor comprises a pressure sensor for sensing fluid pressure in the flow path, the second sensor comprises a temperature sensor for sensing fluid temperature in the flow path, and the third sensor comprises a temperature sensor for sensing fluid temperature in the bore.

10. The fluid metering unit as set forth in claim 1 further comprising an electric circuit board containing electric circuits which is disposed within an open space of the housing overlying the cavities and which has electric connections to the first solenoid valve, the second solenoid valve, the first sensor, and the second sensor.

11. The fluid metering unit as set forth in claim 10 further including a cover closing the open space of the housing, and at least one electric connector on the electric circuit board for connecting electric circuits on the electric circuit board with electric circuits external to the fluid metering unit, the at least one electric connector passing out of the open space through at least one opening in the cover.

12. The fluid metering unit as set forth in claim 10 in which the electric circuit board comprises a circuit for operating the first solenoid valve by either opening or closing the flow path, and a circuit for operating the second solenoid valve by pulse width modulation when the first solenoid valve is being operated to open the flow path.

13. The fluid metering unit as set forth in claim 12 in which the electric circuit board comprises a temperature control circuit having electric connection to the electric-operated temperature control element.

* * * * *